US012754721B2

(12) United States Patent
Ponta et al.

(10) Patent No.: US 12,754,721 B2
(45) Date of Patent: Oct. 6, 2026

(54) JAVA SOURCE CODE AND BYTECODE COMPARISON VIA AN INTERMEDIATE REPRESENTATION

(71) Applicant: SAP SE, Walldorf (DE)

(72) Inventors: Serena Ponta, Mouans-Sartoux (FR); Antonino Sabetta, Mouans-Sartoux (FR)

(73) Assignee: SAP SE, Walldorf (DE)

( * ) Notice: Subject to any disclaimer, the term of this patent is extended or adjusted under 35 U.S.C. 154(b) by 314 days.

(21) Appl. No.: 18/524,397

(22) Filed: Nov. 30, 2023

(65) Prior Publication Data

US 2025/0181333 A1 Jun. 5, 2025

(51) Int. Cl.
*G06F 8/41* (2018.01)

(52) U.S. Cl.
CPC .................................... *G06F 8/433* (2013.01)

(58) Field of Classification Search
CPC ....................................................... G06F 8/433
See application file for complete search history.

(56) References Cited

U.S. PATENT DOCUMENTS 8,667,474 B2 * 3/2014 Radigan .................. G06F 8/456 717/136
9,122,490 B2 * 9/2015 Fanning .................... G06F 8/75
9,305,111 B1 * 4/2016 Fraenkel ................. G06F 40/30
9,910,649 B2 * 3/2018 Erwin ...................... G06F 8/447
10,691,808 B2 * 6/2020 Brucker ................ G06F 21/577
10,713,364 B2 * 7/2020 Abadi ................. G06F 16/9024
(Continued)

FOREIGN PATENT DOCUMENTS

CA 2251369 A1 * 4/2000 ............. G06F 8/433
CN 108984416 A * 12/2018 .......... G06F 11/3604
(Continued)

OTHER PUBLICATIONS

WO-2015150376-A1—NPL Text.*
(Continued)

*Primary Examiner* — Francisco J Aponte
(74) *Attorney, Agent, or Firm* — Mintz Levin Cohn Ferris Glovsky and Popeo. P.C.

(57) ABSTRACT

A computing system receives a request to determine if a given portion of bytecode originated from a particular portion of source code. The computing system converts the source code portion into a first intermediate representation and converts the bytecode portion into a second intermediate representation in response to receiving the request. In an example, the first and second intermediate representations are graphs. The computing system compares the first intermediate representation to the second intermediate representation and determines whether the bytecode portion originated from the source code portion based on the comparison. The computing system causes one or more protective actions to be performed based on determining that the bytecode portion did not originate from the source code portion. These protective actions may include preventing the bytecode portion from being executed in response to determining that the bytecode portion did not originate from the source code portion.

20 Claims, 15 Drawing Sheets

(56) References Cited

U.S. PATENT DOCUMENTS

| | | | | |
|---|---|---|---|---|
| 10,768,925 | B2 * | 9/2020 | Avgustinov | G06F 8/75 |
| 11,144,438 | B1 * | 10/2021 | Teixeira | G06F 8/658 |
| 11,294,894 | B2 * | 4/2022 | Fender | G06F 8/315 |
| 11,606,211 | B2 * | 3/2023 | Liem | H04L 9/0643 |
| 12,105,807 | B1 * | 10/2024 | Bagh | G06F 8/75 |
| 12,314,712 | B1 * | 5/2025 | Schaef | G06F 8/75 |
| 2008/0134207 | A1 * | 6/2008 | Chamieh | G06F 9/4488 719/315 |
| 2011/0126288 | A1 * | 5/2011 | Schloegel | G06F 21/577 717/106 |
| 2019/0171444 | A1 * | 6/2019 | Hegarty | G06F 8/71 |
| 2019/0361686 | A1 * | 11/2019 | Gnazdowsky | G06F 8/65 |
| 2021/0117548 | A1 * | 4/2021 | Gokhman | G06F 8/71 |
| 2024/0419423 | A1 * | 12/2024 | Chen | G06F 9/44552 |

FOREIGN PATENT DOCUMENTS

| | | | | |
|---|---|---|---|---|
| CN | 110928770 | A * | 3/2020 | G06F 11/3688 |
| CN | 113296797 | A * | 8/2021 | G06F 8/63 |
| CN | 115658080 | A * | 1/2023 | |
| CN | 116841899 | A * | 10/2023 | G06F 11/3688 |
| CN | 118819533 | A * | 10/2024 | G06F 11/3628 |
| CN | 114528204 | B * | 10/2025 | G06F 11/366 |
| WO | WO-2015150376 | A1 * | 10/2015 | G06F 21/125 |

OTHER PUBLICATIONS

Tufano, Michele, et al. "Deep learning similarities from different representations of source code." Proceedings of the 15th international conference on mining software repositories. 2018.*

Li, Xin, et al. "Automated vulnerability detection in source code using minimum intermediate representation learning." Applied Sciences 10.5 (2020).*

Wu, Bolun, and Futai Zou. "Code vulnerability detection based on deep sequence and graph models: A survey." Security and Communication Networks 2022.1 (2022).*

Song, Zihua, et al. "HGVul: A Code Vulnerability Detection Method Based on Heterogeneous Source-Level Intermediate Representation." Security and Communication Networks 2022.1 (2022).*

Soto-Valero, César, et al. "A comprehensive study of bloated dependencies in the maven ecosystem." Empirical Software Engineering 26.3 (2021).*

Baker, B. S. et al., "Deducing Similarities in Java Sources from Bytecodes." USENIX Annual Technical Conference. 1998.

Bauer, V. et al., "A Structured Approach to Assess Third-Party Library Usage." 2012.

Bavota, G. et al. "How the apache community upgrades dependencies: an evolutionary study." Empirical Software Engineering 20 (2015): 1275-1317.

Baxter, I.D., et al. "Clone detection using abstract syntax trees." Proceedings. International Conference on Software Maintenance (Cat. No. 98CB36272). IEEE, 1998.

Glanz, L. et al., "CodeMatch: obfuscation won't conceal your repackaged app." In Proceedings of the 2017 11th Joint Meeting on Foundations of Software Engineering, 2017, August, pp. 638-648.

Heinemann, L. et al., "On the extent and nature of software reuse in open source java projects." In Top Productivity through Software Reuse: 12th International Conference on Software Reuse, ICSR 2011, Pohang, South Korea, Jun. 13-17, 2011. Proceedings 12, pp. 207-222.

Johnson, J.H. "Substring Matching for Clone Detection and Change Tracking." (1994).

Kamiya, T. et al., "CCFinder: A multilinguistic token-based code clone detection system for large scale source code." IEEE transactions on software engineering 28.7 (2002): 654-670.

Koschke, R. "Survey of research on software clones." Dagstuhl Seminar Proceedings. Schloss Dagstuhl-Leibniz-Zentrum für Informatik, 2007.

Kula, R.G., et al. "Do developers update their library dependencies? An empirical study on the impact of security advisories on library migration." Empirical Software Engineering 23 (2018).

Lam, P. et al. "The Soot framework for Java program analysis: a retrospective." Cetus Users and Compiler Infastructure Workshop (CETUS 2011).

Mayrand, J. et al., "Experiment on the automatic detection of function clones in a software system using metrics." 1996 Proceedings of International Conference on Software Maintenance. IEEE, 1996.

Myers, E.W. "An O(ND) difference algorithm and its variations." Algorithmica 1.1 (1986): 251-266.

Ragkhitwetsagul, C. et al., "A comparison of code similarity analysers." Empirical Software Engineering 23 (2018): 2464-2519.

Selim, G.M.K. et al., "Enhancing source-based clone detection using intermediate representation." 2010 17th working conference on reverse engineering. IEEE, 2010.

* cited by examiner

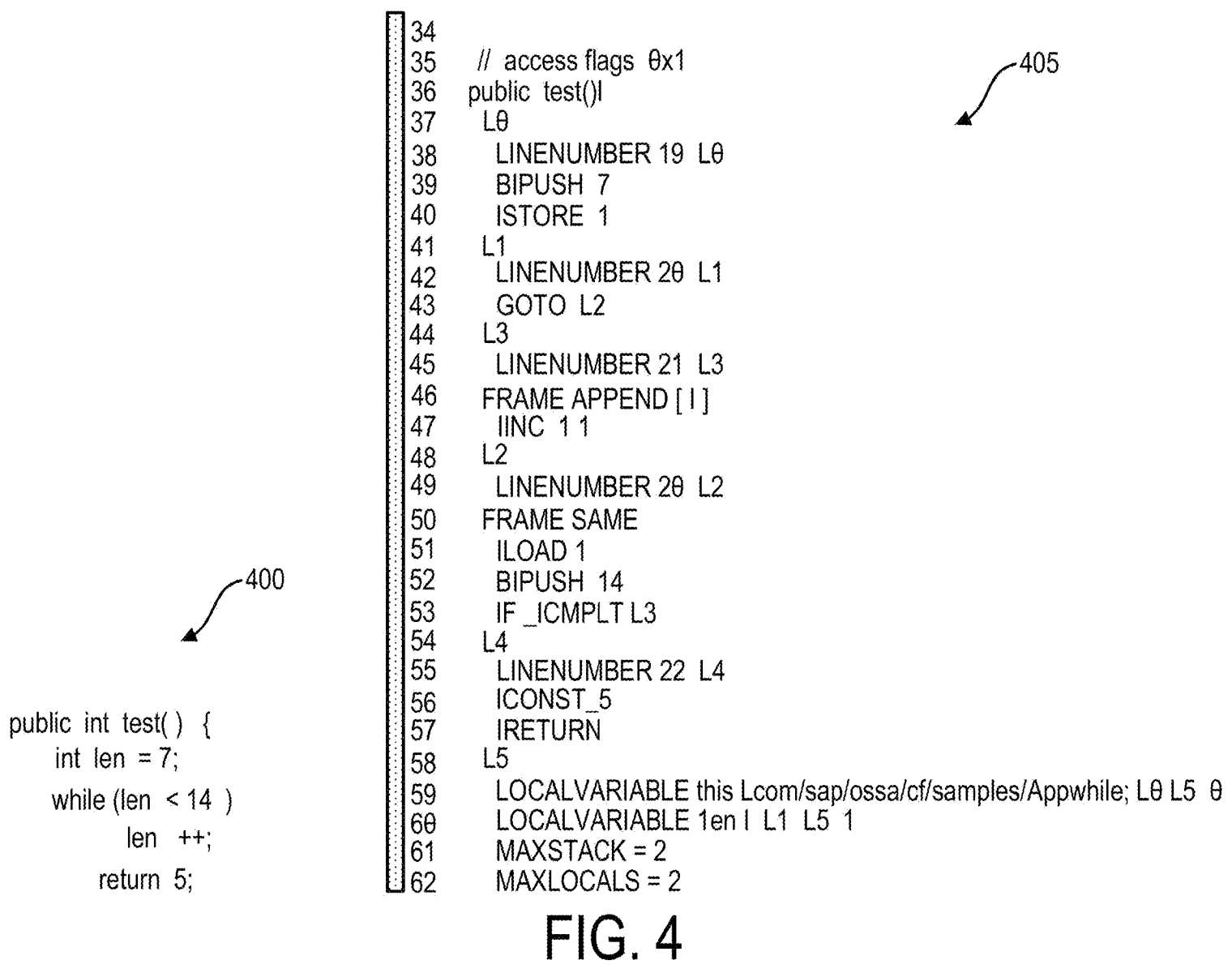

400

```
public int test( ) {
    int len = 7;
    while (len < 14 )
        len ++;
    return 5;
```

405

```
  // access flags 0x1
 public test()I
  L0
   LINENUMBER 19 L0
   BIPUSH 7
   ISTORE 1
  L1
   LINENUMBER 20 L1
   GOTO L2
  L3
   LINENUMBER 21 L3
  FRAME APPEND [ I ]
   IINC 1 1
  L2
   LINENUMBER 20 L2
  FRAME SAME
   ILOAD 1
   BIPUSH 14
   IF _ICMPLT L3
  L4
   LINENUMBER 22 L4
   ICONST_5
   IRETURN
  L5
   LOCALVARIABLE this Lcom/sap/ossa/cf/samples/Appwhile; L0 L5 0
   LOCALVARIABLE 1en I L1 L5 1
   MAXSTACK = 2
   MAXLOCALS = 2
```

FIG. 4

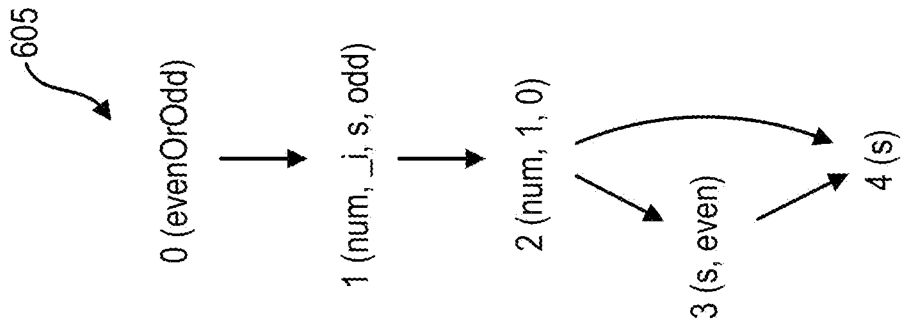
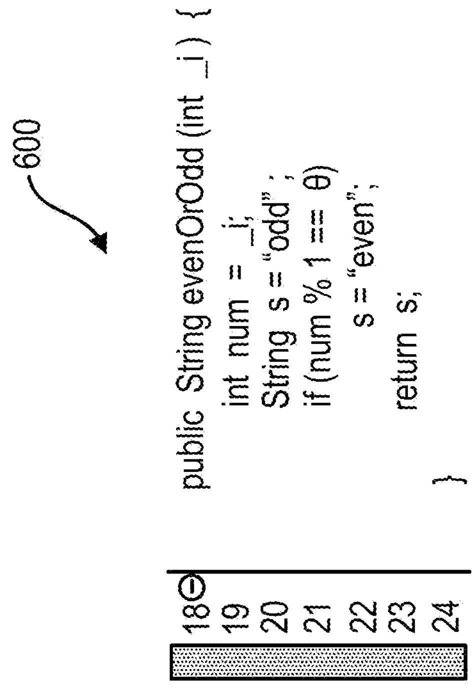
FIG. 6

700

```
// access flags 0x1
public evenOrOdd(I) Ljava/lang/String;
  L0
    LINENUMBER 19 L0
    ILOAD 1
    ISTORE 2
  L1
    LINENUMBER 20 L1
    LDC "odd"
    ASTORE 3
  L2
    LINENUMBER 21 L2
    ILOAD 2
    ICONST_1
    IREM
    IFNE L3
  L4
    LINENUMBER 22 L4
    LDC "even"
    ASTORE 3
  L3
    LINENUMBER 23 L3
  FRAME APPEND [ I java/lang/String]
    ALOAD 3
    ARETURN
  L5
    LOCALVARIABLE this Lcom/sap/ossa/cf/samples/AppIf ;
    LOCALVARIABLE _i I L0 L5 1
    LOCALVARIABLE num I L1 L5 2
    LOCALVARIABLE s Ljava/lang/String; L2 L5 3
    MAXSTACK = 2
    MAXLOCALS = 4
```

FIG. 7

JAVA SOURCE CODE AND BYTECODE COMPARISON VIA AN INTERMEDIATE REPRESENTATION

TECHNICAL FIELD

The present disclosure generally relates to source code and bytecode analysis.

BACKGROUND

While developers create software programs writing source code (e.g. using a language such as Java), what is executed at run-time by a computer is a lower-level executable form of the program. In the case of Java, the source code is compiled to bytecode and the execution occurs on the Java Virtual Machine (JVM). As used herein, the term "bytecode" may be defined as source code that has been compiled into low-level code designed to be executed by a virtual machine or interpreter. Alternatively, the term "bytecode" may be defined as computer object code that is compiled into machine code to be executed by at least one processor. Modern development practices make a wide use of third-party libraries, treated as components that are embedded, as compiled artifacts, in other projects. Automated build systems automatically handle software dependencies such as the set of third-party libraries that a given project depends upon. When developing in Java, Maven and Gradle are widely used build systems. These build systems allow developers to declare the direct dependencies of their project in manifest files. Direct dependencies, as well as their dependencies (referred to as transitive dependencies), are automatically retrieved from package repositories, such as Maven Central. These dependencies are downloaded in the form of compiled packages containing Java bytecode.

SUMMARY

In some implementations, a computing system receives a request to determine if a given portion of bytecode originated from a particular portion of source code. The computing system converts the source code portion into a first intermediate representation and converts the bytecode portion into a second intermediate representation in response to receiving the request. In an example, the first and second intermediate representations are graphs. The computing system compares the first intermediate representation to the second intermediate representation and determines whether the bytecode portion originated from the source code portion based on the comparison. The computing system causes one or more protective actions to be performed based on determining that the bytecode portion did not originate from the source code portion. These protective actions may include preventing the bytecode portion from being executed in response to determining that the bytecode portion did not originate from the source code portion.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates a method and corresponding bytecode, in accordance with some example implementations of the current subject matter;

FIG. 6 illustrates an evenOrOdd method and corresponding graph, in accordance with some example implementations of the current subject matter;

FIG. 7 illustrates an example of bytecode for the evenOrOdd method, in accordance with some example implementations of the current subject matter;

DETAILED DESCRIPTION

Figure 1:
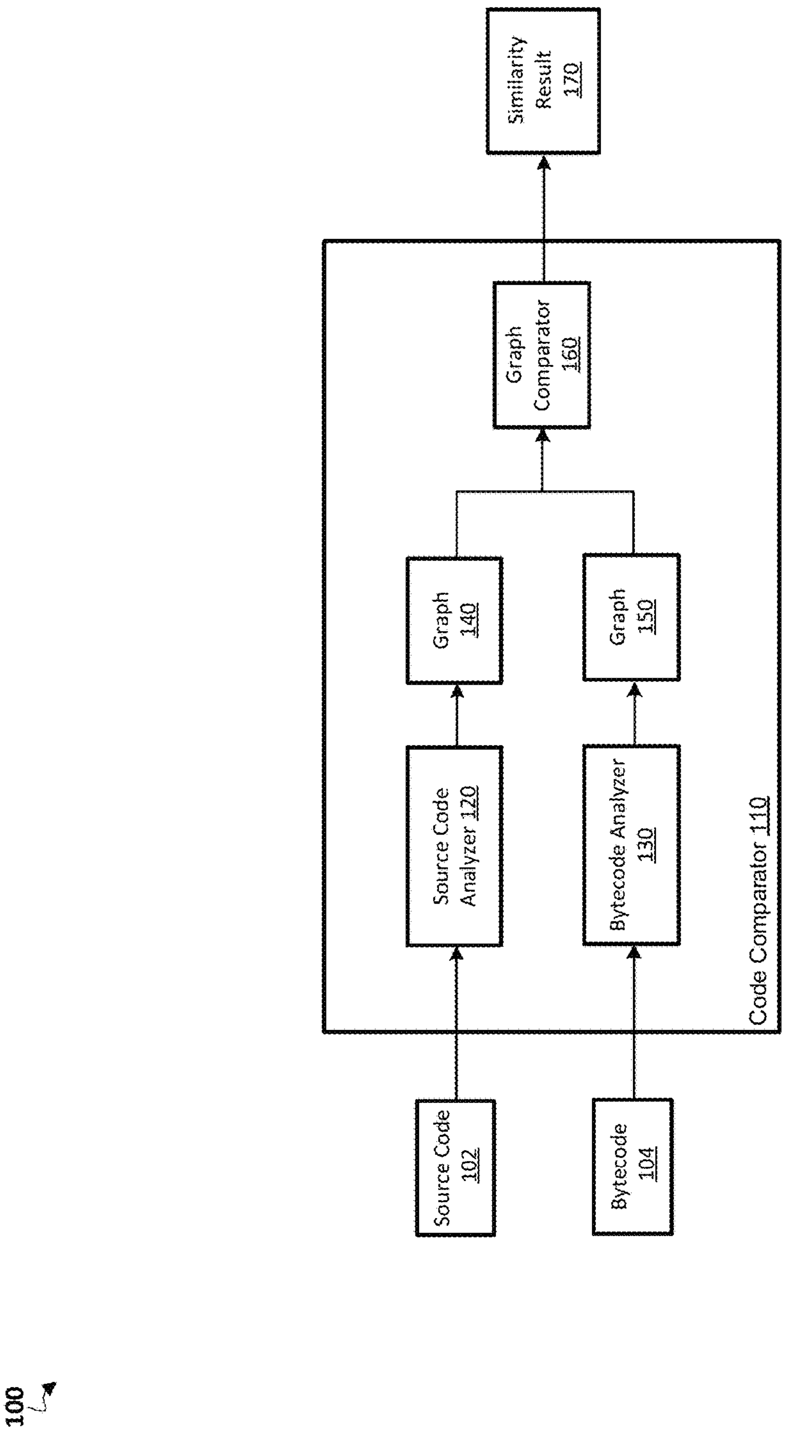
FIG. 1 illustrates a logical diagram of an example of a computing apparatus, in accordance with some example implementations of the current subject matter.

Downstream projects with software dependencies related to third-party libraries face multiple challenges. The package repositories from which software artifacts are downloaded do not provide any guarantee that the bytecode contains only the result of the compilation of the originating project. So even if the source code was reviewed before adoption, downstream users are subject to open-source supply chain attacks that explicitly target upstream open-source software (OSS) components to infect downstream users. A commonly used attack vector is to tamper with a build system in such a way that the build artifacts contain malicious bytecode in addition to the result of the compilation of the source code.

Known vulnerabilities (i.e., vulnerabilities accidentally introduced by developers, and responsibly disclosed and published) are corrected in the source code and fixed versions of the libraries are then released. The fixed versions of the source code are then made available. However it is not possible to check whether the known vulnerabilities are contained in the downloaded packages as these packages contain bytecode. Though advisories list the vulnerable and fixed versions, there is no guarantee that the changes introduced by the correction in the source code are included in the released (bytecode) artifact. There is no easy way to verify if bytecode includes a known vulnerability since it is not possible to directly compare source code and bytecode.

It is common practice in Java to re-bundle and re-package dependencies (or parts thereof) within a project. Software developers often do this to obtain a single, self-contained executable (often named using the suffix 'jar-with-dependencies'). Re-bundling a dependency means that the dependency's entire bytecode is included in a new artifact. In the case of re-packaging, fully qualified names of constructs are modified by adding a prefix (e.g., obtaining the package name 'com.foo.org.apache.project' starting from 'org.apache.project'). In both cases the result is that the bytecode instructions of an old artifact end up in a new artifact. This is critical in cases of re-bundling and re-packaging of vulnerable libraries. Failing to identify vulnerable code in re-bundles results in applications being vulnerable even after upgrading the original vulnerable dependency. The same holds true in the case of code clones. Again, identifying vulnerable parts of bytecode artifacts based on the corresponding source code involves comparing source code and bytecode.

These challenges can be overcome with the ability to compare Java source and Java bytecode to perform multiple checks. A first check is assessing whether an artifact contains only what derives from the compilation of the corresponding source code. The first check ensures that no malicious code was injected during the build. A second check is assessing whether a given version of a vulnerable artifact contains, or does not contain, the patch for known vulnerabilities. A third check assesses whether an arbitrary artifact contains vulnerable code, also covering the case of re-bundling, re-packaging, or cloning code.

However, Java is a compiled language where the source code and its compiled counterpart (i.e., the bytecode) have different aspects. Given a snippet of bytecode, and a snippet of source code, it is thus a question of how to establish if they are equal or how close they are. To address this challenge, Java source code may be compared to bytecode through the use of a common intermediate representation.

In an example, a uniform graph representation is created to capture key aspects of bytecode and source code instructions. For example, an abstract model is extracted from Java source code in the form of a first graph. Also, in one example, an abstract model is extracted from Java bytecode in the form of a second graph. Then, in an example, the first and second graphs are compared to establish the similarity of the Java source code to the Java bytecode. In some examples, the graph representation does not preserve the semantics of the original source code and bytecode but retains key features that enable the comparison, such as control-flow instructions, variable names, names of invoked methods, and the like. In Java, instructions are executed sequentially in the order they appear (referred to as sequential instructions) unless control flow instructions are used that alter the flow of execution (e.g., deciding among alternative paths, looping instructions, or jumping).

It should be understood that while examples are given throughout this specification in the context of Java source code and Java bytecode, this does not preclude the use of the methods and mechanisms presented herein from being used with other types of programming languages (e.g., C#, Scala). The examples described in the context of Java source code and Java bytecode are intended to serve as examples of comparing source code portions to bytecode portions regardless of the programming language in which they are originally written.

Referring now to FIG. 1, a logical diagram illustrating an example of a computing apparatus 100 is depicted, in accordance with some example embodiments. In FIG. 1, the computing apparatus 100 may include a code comparator 110 which receives source code 102 and bytecode 104. Code comparator 110 may be implemented using any suitable combination of circuitry (e.g., processing unit, programmable logic device, field-programmable gate array (FPGA), application specific integrated circuit (ASIC)), firmware, and/or program instructions.

In an example, code comparator 110 receives a pair of source code 102 and bytecode 104 snippets which are a .java file and a class file, respectively. Source code 102 is processed by source code analyzer 120 in order to perform an analysis of source code 102, and bytecode 104 is processed (i.e., scanned) by bytecode analyzer 130 in order to perform an analysis of bytecode 104. It is noted that bytecode analyzer 130 may also be referred to herein as a bytecode scanner. Source code analyzer 120 generates graph 140 which is an intermediate representation of source code 102. Similarly, bytecode analyzer 130 generates graph 150 which is an intermediate representation of bytecode 104. Graphs 140 and 150 are provided as inputs to graph comparator 160 which returns a similarity result 170 based on how similar graph 140 is to graph 150.

There are many different ways in which the similarity result 170 may be generated, with the type of similarity result 170 varying from embodiment to embodiment. In an example, similarity result 170 is a binary value, with a "1" value indicating that the graphs 140 and 150 are the same or highly similar, and a "0" value indicating that the graphs 140 and 150 are different. In another example, similarity result 170 is a percentage from 0 to 100, with a higher percentage indicating a closer similarity between the graphs 140 and 150 and a lower percentage indicating less similarity between the graphs 140 and 150. Other ways of generating and representing similarity result 170 are possible and are contemplated.

One or more actions may be taken in response to the similarity result 170 that is generated. Depending on similarity result 170, these actions may include preventing execution of bytecode 104, enabled execution of bytecode 104, labeling bytecode 104 as suspicious or containing a vulnerability, labeling bytecode 104 as benign, generating a message, warning, and/or notification, and/or other actions.

In an example, source code analyzer 120 receives as an input Java source code and transforms the Java source code into a first graph (e.g., graph 140). Also, in this example, bytecode analyzer 130 receives as an input Java bytecode and transforms the Java bytecode into a second graph (e.g., graph 150). In other examples, source code analyzer 120 and bytecode analyzer 130 receive source code and bytecode snippets which are created using other languages besides Java.

In an example, each of the first graph and the second graph is defined as follows: Let G=(N,E) be a directed graph where N is the set of nodes and E is the set of directed edges (i.e., ordered pairs of nodes n in N). Given two nodes A and B, it is determined that B "follows" A and that B is a "following" node of A if there exists a directed edge from A to B. Sequential nodes of G are defined as being those nodes n in N having at most 1 following node. Branching nodes of G are defined as being those nodes n in N having at least 2 following nodes. Each node is characterized by a set of words (e.g., names of invoked methods, variable names, constant values).

In an example, the graph 140 that is the output of the source code analyzer 120 and the graph 150 that is the output of the bytecode analyzer 130 have the following characteristics: an initial root node characterizes the code snippet being represented (e.g., using class signature, method signature, or snippet line numbers). Also, sequential nodes contain words from sequential instructions including, but not limited to, variable identifiers, names of invoked methods, integers, and names of thrown exceptions. Additionally, branching nodes correspond to control flow instructions and contain the words from the control flow condition, and each following node will correspond to a possible execution path.

Figure 2:
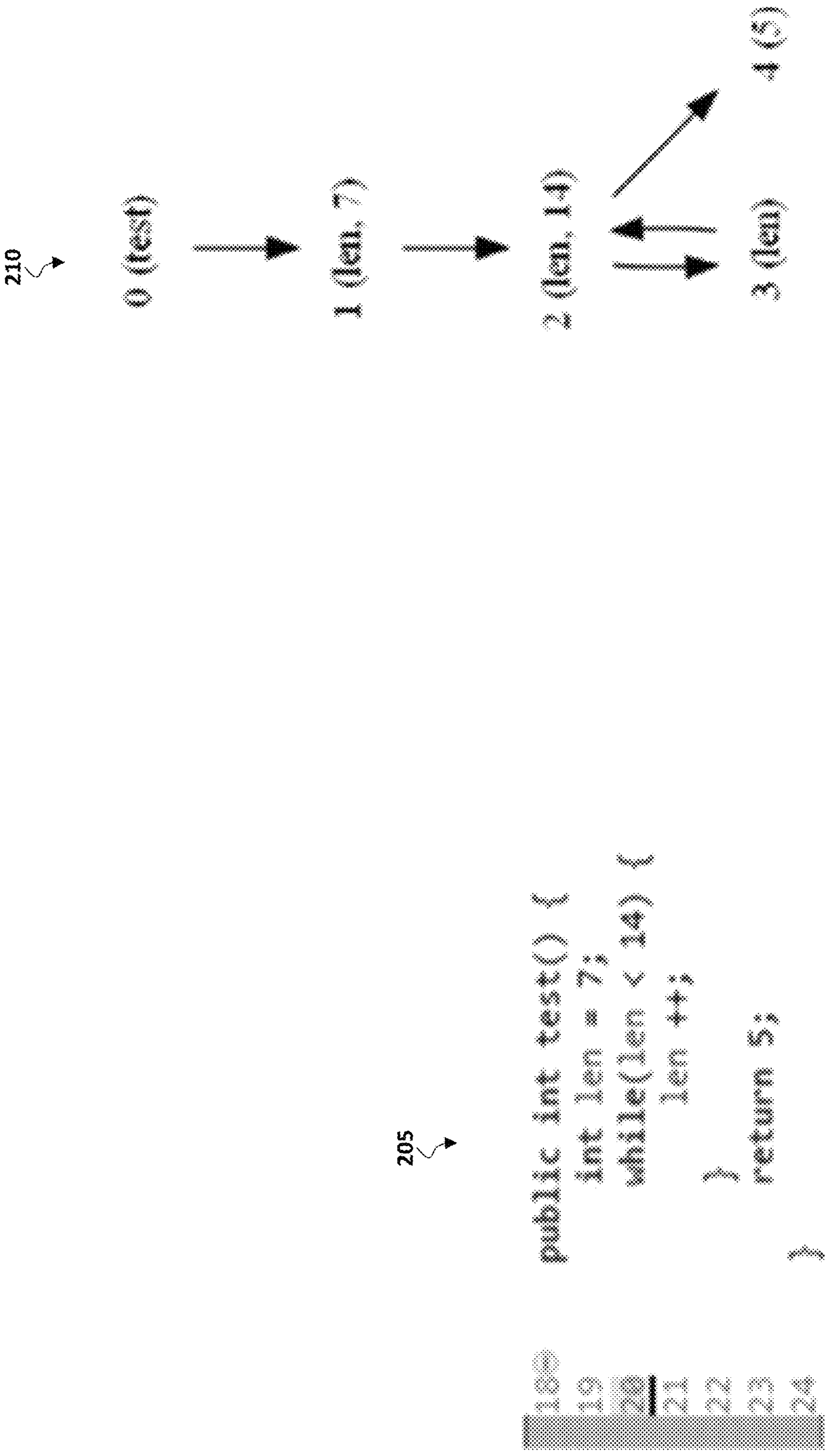
FIG. 2 illustrates a method and a corresponding graph, in accordance with some example implementations of the current subject matter.

Turning now to FIG. 2, a diagram is depicted of a method 205 and a corresponding graph 210 for the method consistent with implementations of the current subject matter. In the graph 210, numbers are used as identifiers for the nodes and the words characterizing the nodes are shown in parentheses. The graph 210 is valid as it has a root node characterized by the method signature (only the method name "test" is shown), the nodes with identifiers "1", "3", and "4" are sequential nodes and are characterized by the words of the sequential instructions in lines 19, 21, and 23, respectively, of method 205. The node with identifier "2" is a branching node characterized by the words of the control flow condition in line 20 and having two following nodes corresponding to the different execution paths that may be followed (i.e., the body of the while block and the instruction following the while block).

A source code analyzer (e.g., source code analyzer 120) may build the graph 210 starting from representations of the source code such as Parse Trees (PTs) or Control Flow Graphs (CFGs). Using parse trees, the source code analyzer may build the graph 210 collecting the words characterizing nodes from the leaves containing names of invoked methods, variables names, literals used within expressions, and so on. Branching nodes may be built whenever control flow instructions (e.g., IF/ELSE, WHILE, FOR) are encountered while visiting the parse tree.

Figure 3:
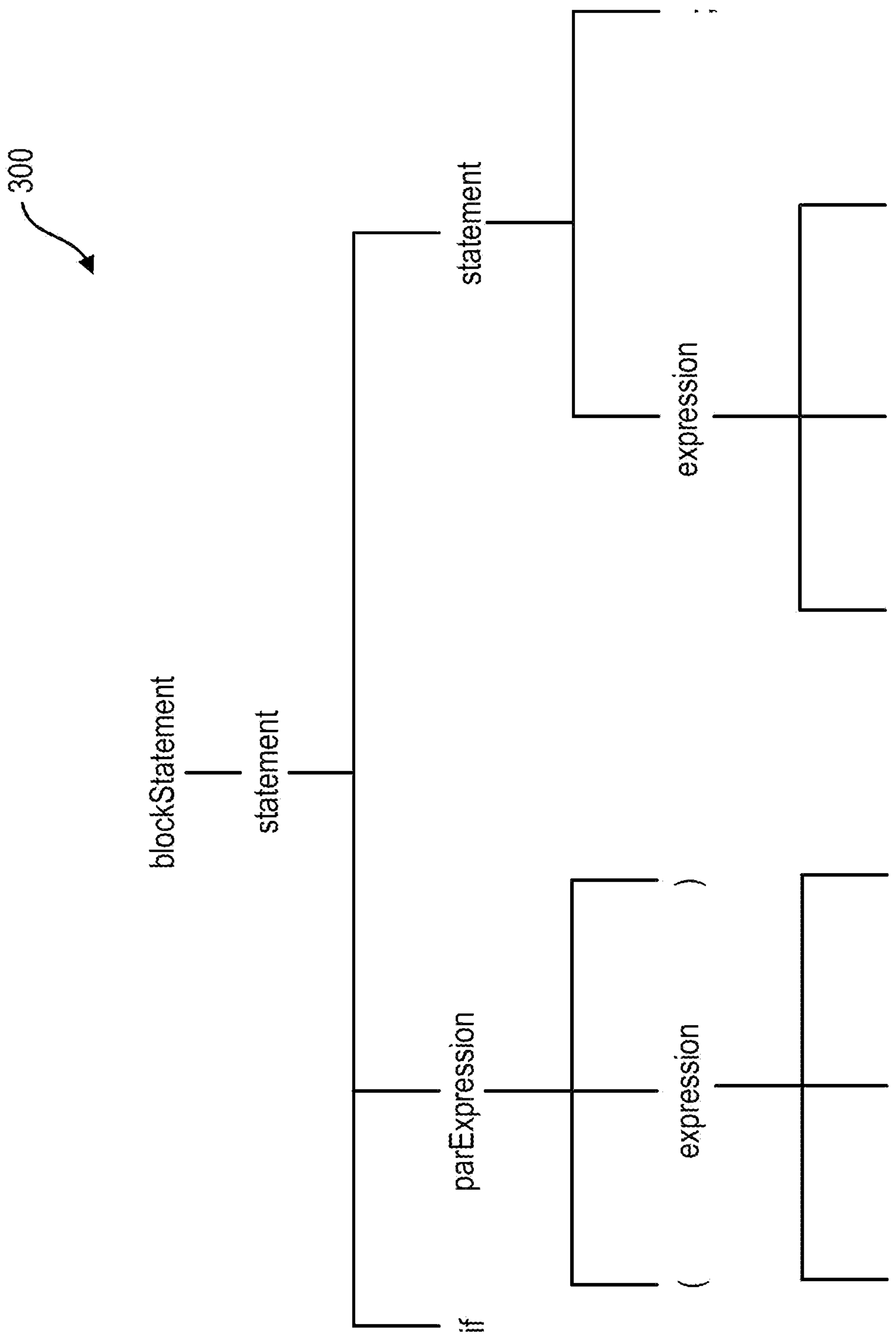
FIG. 3 illustrates an example of a parse tree, in accordance with some example implementations of the current subject matter.

Referring now to FIG. 3, an example is shown of an extract of a parse tree 300 built using the ANTLR library. The parse tree 300 in FIG. 3 may be used to detect the presence of the IF/WHILE/FOR keywords as the first child of the "statement" node in the parse tree 300 to then process the subtree according to the construct semantics (e.g., the "parExpression" subtree to retrieve the IF instruction condition and the sibling "statement" subtree to retrieve the IF body). In an example, a bytecode analyzer (e.g., bytecode analyzer 130 of FIG. 1) may build a graph starting from any parsable version of the bytecode.

In general, a graph can be built from a parse tree as follows: (1) create a root node; (2) create a new empty following node; (3) visit the parse tree, for example, walk the tree and trigger events when visiting the parse tree nodes; (4) for each event: (a) if the parse tree node contains a variable name, a name of an invoked method, literal, or so on, then annotate the node with the current word; (b) if the parse tree node contains a control flow instruction, then create a node with words from the control flow condition and a following node for each possible path; (b1) enhance the following node by visiting the subtree (go to step 3 above); (b2) add the empty node "m" as a following node of node "f".

Turning now to FIG. 4, the java method 400 "test" and the bytecode 405 resulting from compilation of the java method "test" are shown. The java method 400 "test" shown on the left-side of FIG. 4 is the same as used in FIG. 2. The bytecode 405 in FIG. 4 is obtained using the ASM library, but the same semantics with minor syntax changes can be obtained via other utilities, like the Java Class File Disassembler.

The bytecode instructions are grouped in labels L0 to L5 where the last label contains the list of variables of the method 400 with their name, type, scope, and index used within the other labels (lines 59 to 62). Bytecode instructions are composed of an opcode (e.g., BIPUSH, ISTORE, ILOAD, ICONST_0) and arguments, if any.

In an example, a bytecode analyzer (e.g., bytecode analyzer 130 of FIG. 1) may build a valid graph by processing the bytecode instructions. For example, the bytecode analyzer may create a branching node whenever a bytecode opcode for conditional jumps (e.g., IFEQ, IF_ICMPLT, IF_NULL) is encountered, and the bytecode analyzer may annotate nodes with words taken from other kinds of bytecode instructions.

In an example, words characterizing the graph nodes may be obtained from the following bytecode instructions: ISTORE <index> and ILOAD <index> to obtain the variable names (through the mapping of index to name); ICONST_0 to ICONST_5, to obtain integers 0 to 5; BIPUSH <i> to obtain integer "i"; INVOKE_DYNAMIC <method name>, INVOKE_VIRTUAL <method name>, INVOKE_STATIC <method name> to obtain the name of invoked methods.

It is noted that the GOTO bytecode opcode does not originate a branching node as it's not a conditional jump but it encodes a sequential execution whose next instruction is found at the target of the jump. In an example, the graph may be constructed as follows: (1) create a root node; (2) create a new empty following node; (3) for each bytecode instruction: (a) If NOT "conditional jump opcode" (e.g., ISTORE) →annotate node with current word; (b) If GOTO→continue processing target instruction (go to step 3); (c) If "conditional jump opcode" (e.g., IFNULL, IFNONNULL, IFEQ) →create a following node annotated with words from the control-flow condition and having following nodes for each possible execution path; (c1) For each path (i.e., subsequent instructions and instructions target of the jump), continue from step 3.

The resulting graphs are the input of a graph comparator (e.g., graph comparator 160 of FIG. 1) that compares the graphs recursively starting from the root node. In an example, two nodes are equal if they are characterized by the same set of words and by the same set of following nodes. In case they differ, the graph comparator returns a similarity measure (e.g., the number of different nodes, edges).

Figure 5:
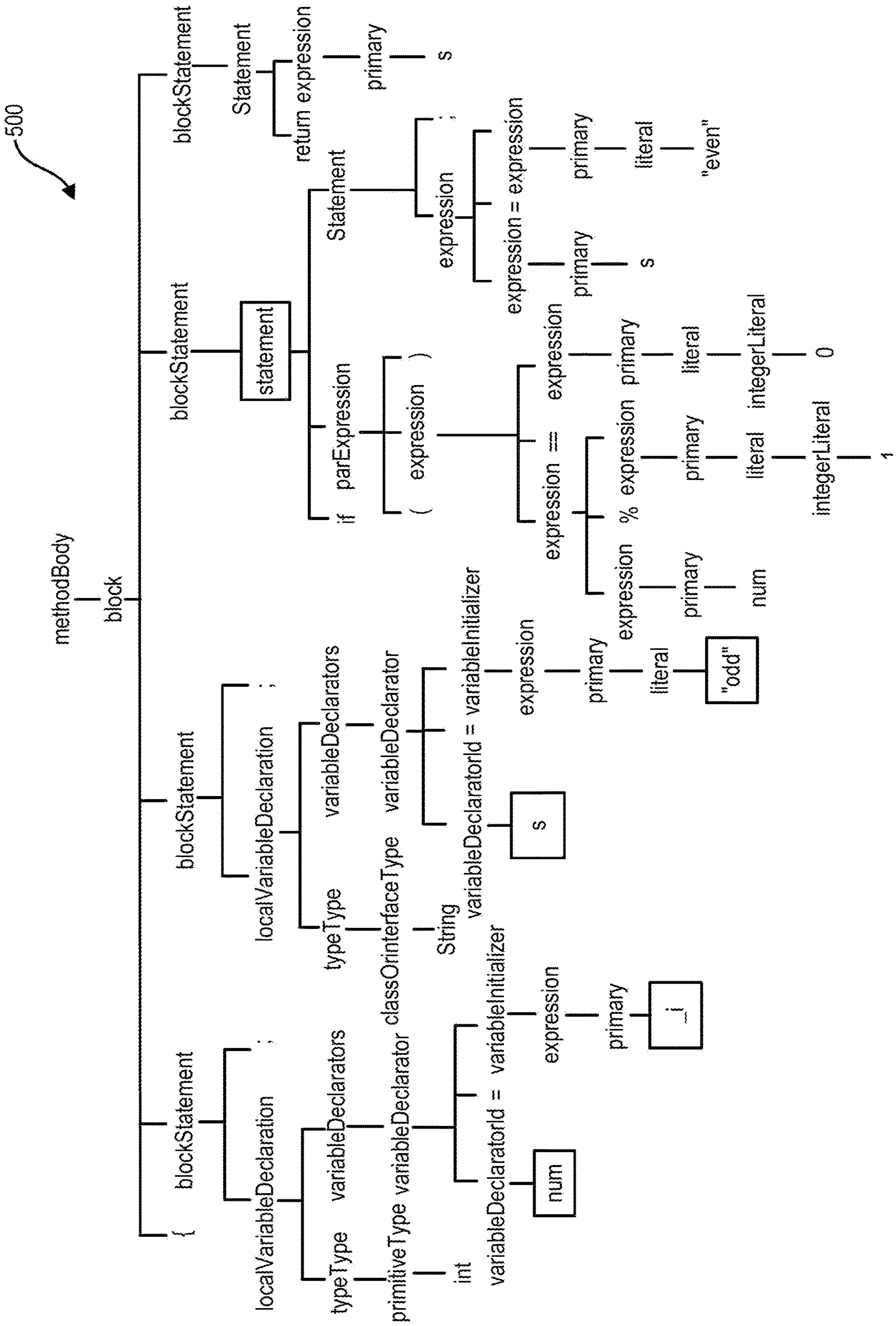
FIG. 5 illustrates a parse tree, in accordance with some example implementations of the current subject matter.

Referring now to FIG. 5 and FIG. 6, a parse tree 500 is shown in FIG. 5 for the source code 600 of the method "evenOrOdd", shown on the left-side of FIG. 6, which returns whether an input integer is even or odd. Also, a graph creation example is shown on the right-side of FIG. 6 for the same Java method "evenOrOdd" that returns whether an input integer is even or odd. In an example, a source code analyzer (e.g., source code analyzer 120 of FIG. 1) uses the parse tree 500 of FIG. 5 as generated by ANTLR 4.10.1. Both words characterizing nodes as well as control-flow instructions are processed overriding ANTLR methods to either collect words or create branching nodes while visiting the parse tree 500. Some examples are as follows: exitMethodCall overridden to obtain called methods names; enterVariableDeclarator overridden to obtain variables names; enterPrimary overridden to obtain variables name and literals used within any other expression; and exitStatement overridden to detect the presence of the if/while/for keywords and create a branching node.

Graph 605 is shown on the right-side of FIG. 6, and the graph 605 may be generated by a source code analyzer (e.g., source code analyzer 120 of FIG. 1) by way of example. The graph 605, as shown, includes nodes identified by integers while the sets of words characterizing the nodes are shown in parentheses. Following the previously-described approaches, the root node, with id "0", is characterized by the method signature (just the method name "evenOrOdd" is shown in the figure). The two sequential instructions (lines 19, 20 in bytecode 700 of FIG. 7) are encoded in a single graph node with id "1". The words of node "1" are collected overriding the "enterPrimary" and "enterVariableDeclarator" events (words indicated by boxes in FIG. 5). The "enterStatement" event is triggered when visiting the node indicated by the rectangle in the upper-right portion of FIG. 5 and is used to detect the presence of the IF branching instruction as its left-most child contains the keyword "if". The control-flow instruction IF originates a new node "2" characterized by the IF conditions (i.e., variable "num" and integers "1" and "0"). Node "2" has two following nodes as the IF statement implies two alternative execution paths, (i.e., executing or skipping the IF body before continuing to line 23 of source code 600). As a result, both node "3" and node "2" have a following node "4" that represent the continuation of execution. The content of the IF body is represented in node "3".

In an example, a bytecode analyzer (e.g., bytecode analyzer 130 of FIG. 1) processes the bytecode 700 (of FIG. 7) using ASM 9.3. In an example, bytecode 700 is obtained by compiling the source code 600 of the method "evenOrOdd" shown on the left-side of FIG. 6. The ASM representation of the bytecode 700 for the method "evenOrOdd" is shown in FIG. 7. The resulting graph 605 is shown on the right-side of FIG. 6.

As previously described, when the bytecode analyzer processes bytecode 700, a root node is created, characterized by the method signature. Sequential instructions (i.e., all instructions until line 51) originate a single node with identifier "1" characterized by the constant "odd" (line 44) and the local variables having index 1,2,3 (as an example the variable with index 1 that appears in line 40 is the local variable "_i" that is the one having index 1 as shown in line 63.) The jump instruction at line 51 IF_NE is the instruction responsible for the creation of two following nodes, one node containing the instructions found at the target of the jump given by the label L3 (referenced in line 51 and defined in lines 56 to 60) and another node containing the subsequent instructions as of line 52.

In this illustrative example, the resulting graphs generated for the source code 600 and bytecode 700 are equal. In case of differences, the comparison may generate a similarity result that outputs the nodes that differ in terms of set of words and following nodes and provide a measure (e.g., in terms of number of words that differ). In some cases, a compiler may have renamed some variables during compilation, and so if the words associated with each graph node are different but the underlying structures of the graphs are the same or substantially similar, then the similarity result may reflect this similarity with a high similarity score regardless of the separate graphs having different names for the common nodes.

It should be understood that this particular example, with numbers of lines of source code and bytecode, and types of instructions, variable names, and so on, is merely meant to serve as an example illustrating the current subject matter. Other types and sizes of source code and bytecode, with hundreds of lines of source code and bytecode, thousands of lines, millions of lines, and so on, are possible and are contemplated in accordance with the methods and mechanisms presented herein.

Figure 8:
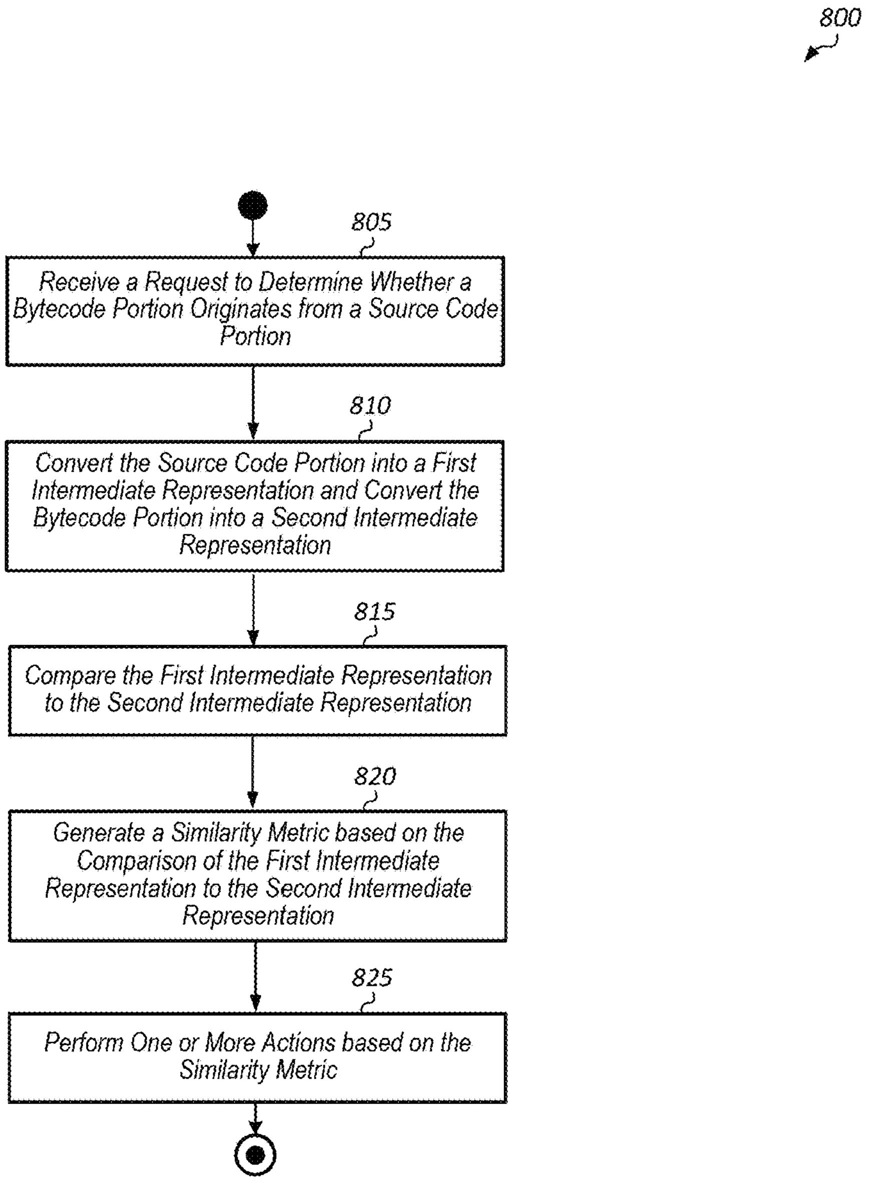
FIG. 8 illustrates an example of a process for determining a similarity metric between a source code portion and a bytecode portion, in accordance with some example implementations of the current subject matter.

Referring now to FIG. 8, a flow diagram illustrating a method for determining a similarity metric between a source code portion and a bytecode portion is shown. A processor of a computing system receives a request to determine whether a bytecode portion originates from a source code portion (block 805). In other words, the request is to determine whether the bytecode portion was generated (i.e., compiled) from a particular source code portion. In an example, the source code portion may correspond to a piece of source code with a known vulnerability. An organization may wish to determine whether a bytecode portion which is part of some executable code originated from this particular source code portion. In other examples, the request to determine whether a bytecode portion originated from a source code portion may be generated in other types of scenarios.

In response to receiving the request, the processor converts the source code portion into a first intermediate representation and the processor converts the bytecode portion into a second intermediate representation (block 810). In various embodiments, the first intermediate representation and the second intermediate representation are graphs. In other embodiments, the first intermediate representation and the second intermediate representation are other types of data structures (e.g., tables, matrices).

Next, the processor compares the first intermediate representation to the second intermediate representation (block 815). Then, the processor generates a similarity metric based on the comparison of the first intermediate representation to the second intermediate representation (block 820). The similarity metric indicates how similar the first intermediate representation is to the second intermediate representation. In an example, the similarity metric is specified as a percentage from 0 to 100. In other examples, the similarity metric may be specified in other suitable manners. Next, the processor performs one or more actions based on the similarity metric (block 825). In an example, the processor may prevent the bytecode from being executed if the similarity metric is below a threshold. In another example, the processor may generate a notification in response to the similarity metric being above a threshold. In other examples, the processor may perform other actions in response to the similarity metric being above or below a threshold. After block 825, method 800 ends.

Figure 9:
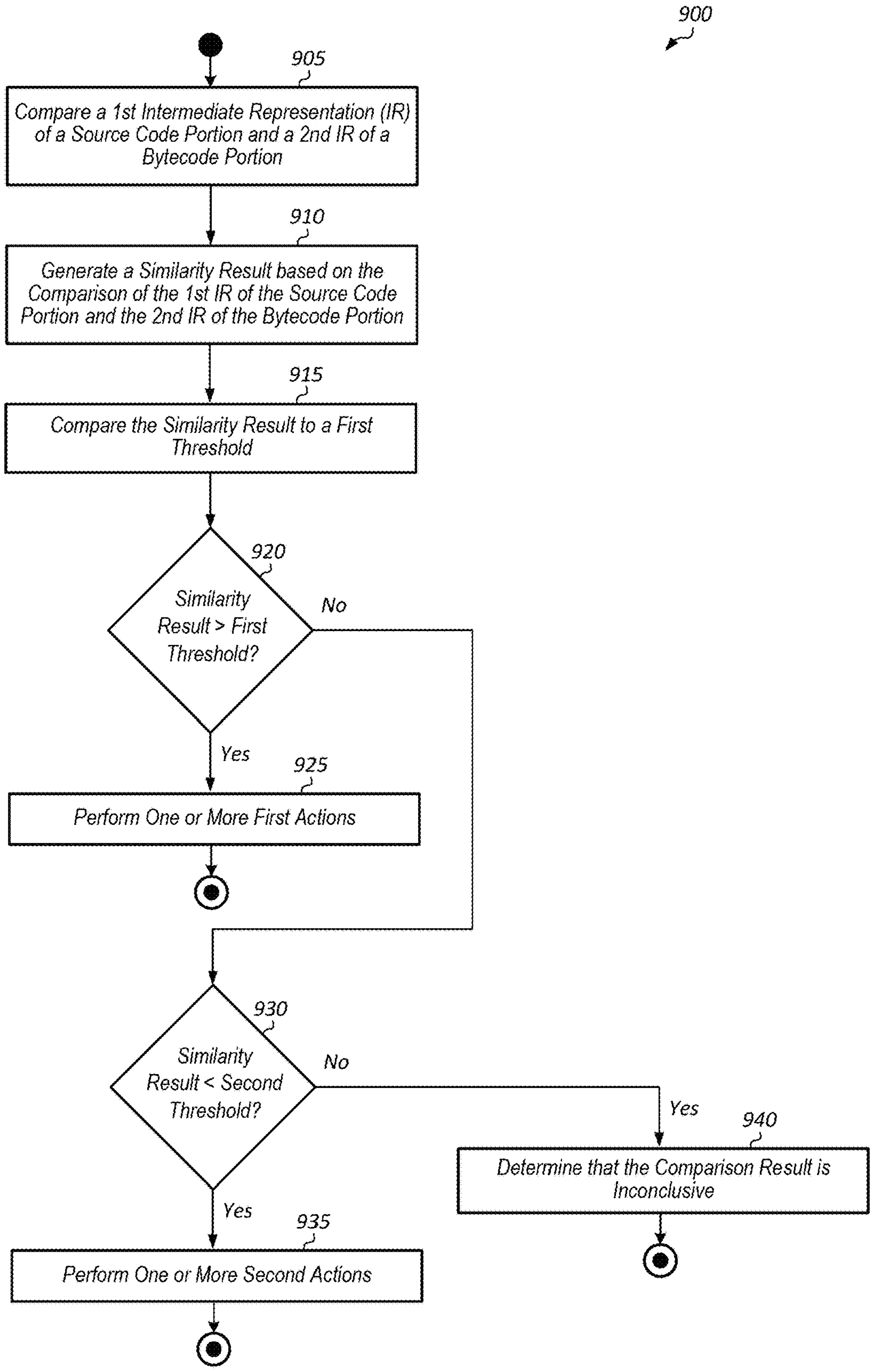
FIG. 9 illustrates an example of a process for comparing a first intermediate representation of a source code portion and a second intermediate representation of a bytecode portion, in accordance with some example implementations of the current subject matter.

Turning now to FIG. 9, a flow diagram illustrating a method for comparing a first intermediate representation of a source code portion and a second intermediate representation of a bytecode portion is shown. A processor of a computing system compares a first intermediate representation of a source code portion and a second intermediate representation of a bytecode portion (block 905). The processor generates a similarity result based on the comparison of the first intermediate representation of the source code portion and the second intermediate representation of the bytecode portion (block 910). Next, the processor compares the similarity result to a first threshold (block 915). If the similarity result is greater than the first threshold (conditional block 920, "yes" leg), then the processor performs one or more first actions (block 925). For example, the one or more first actions may include allowing execution of the bytecode portion, preventing execution of the bytecode portion, generating a message in a graphical user interface and/or notification to one or more users, and/or other actions. After block 925, method 900 ends. If the similarity result is less than or equal to the first threshold (conditional block 920, "no" leg), then the processor compares the similarity result to a second threshold (conditional block 930). If the similarity result is less than the second threshold (conditional block 930, "yes" leg), then the processor performs one or more second actions (block 935). After block 935, method 900 ends. If the similarity result is greater than or equal to the second threshold (conditional block 930, "no" leg), then the processor determines that the comparison result is inconclusive (block 940). In some cases, the processor may take one or more third actions in response to determining that the comparison is inconclusive, such as generating a message or notification to a user that the comparison did not result in a definitive answer as to whether the bytecode portion is equivalent or not to the source code portion, running a different type of comparison between the first and second intermediate representations, or other actions. After block 940, method 900 ends.

Figure 10A:
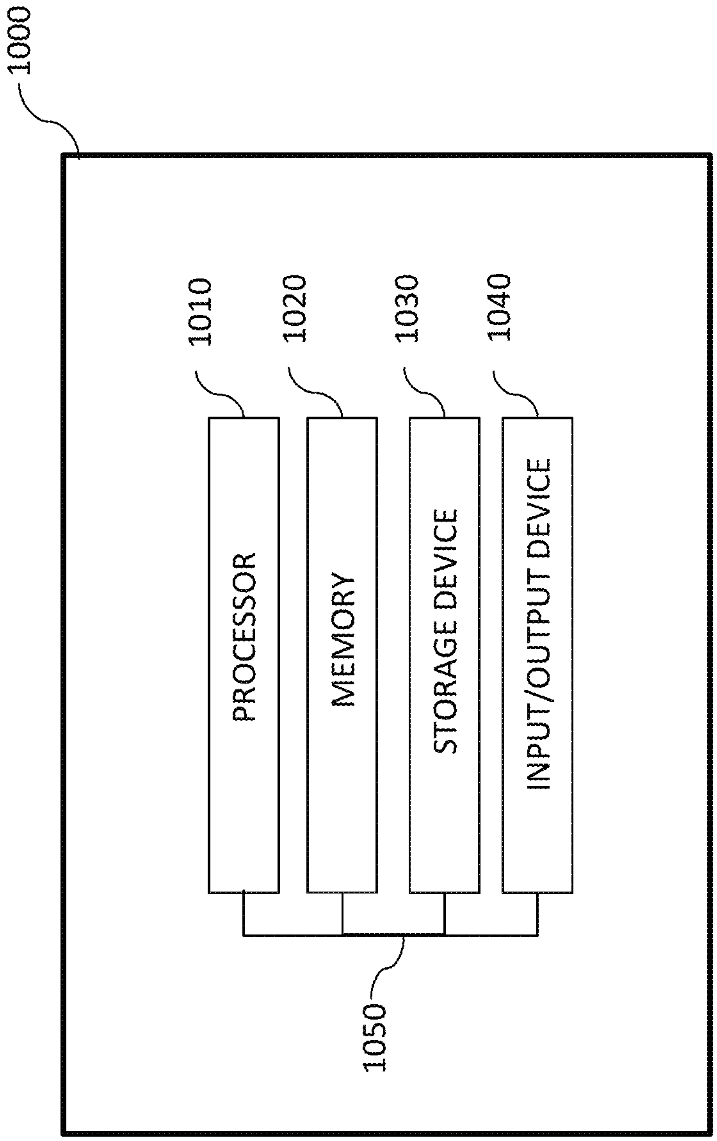
FIG. 10A depicts an example of a system, in accordance with some example implementations of the current subject matter.

In some implementations, the current subject matter may be configured to be implemented in a system 1000, as shown in FIG. 10A. The system 1000 may include a processor 1010, a memory 1020, a storage device 1030, and an input/output device 1040. Each of the components 1010, 1020, 1030 and 1040 may be interconnected using a system bus 1050. The processor 1010 may be configured to process instructions for execution within the system 1000. In some implementations, the processor 1010 may be a single-threaded processor. In alternate implementations, the processor 1010 may be a multi-threaded processor. The processor 1010 may be further configured to process instructions stored in the memory 1020 or on the storage device 1030, including receiving or sending information through the input/output device 1040. The memory 1020 may store information within the system 1000. In some implementations, the memory 1020 may be a computer-readable medium. In alternate implementations, the memory 1020 may be a volatile memory unit. In yet some implementations, the memory 1020 may be a non-volatile memory unit. The storage device 1030 may be capable of providing mass storage for the system 1000. In some implementations, the storage device 1030 may be a computer-readable medium. In alternate implementations, the storage device 1030 may be a floppy disk device, a hard disk device, an optical disk device, a tape device, non-volatile solid state memory, or any other type of storage device. The input/output device 1040 may be configured to provide input/output operations for the system 1000. In some implementations, the input/output device 1040 may include a keyboard and/or pointing device. In alternate implementations, the input/output device 1040 may include a display unit for displaying graphical user interfaces.

Figure 10B:
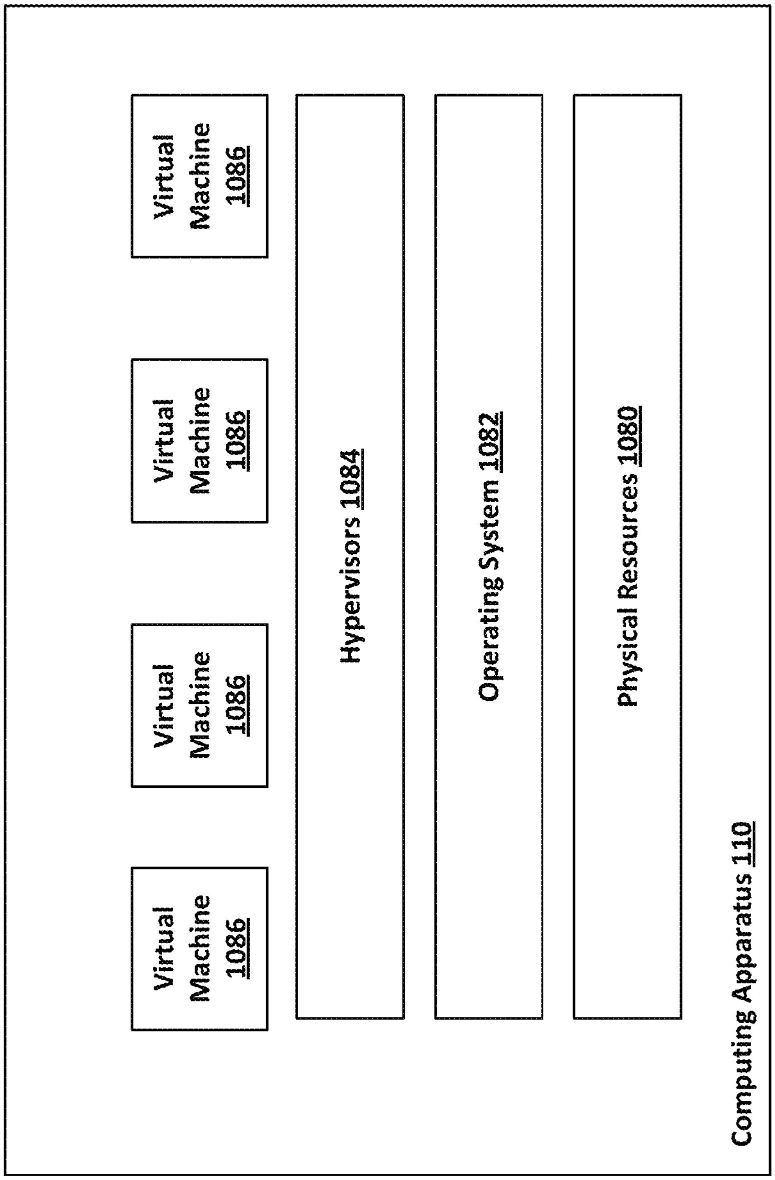
FIG. 10B depicts another example of a system, in accordance with some example implementations of the current subject matter.

FIG. 10B depicts an example implementation of a computing apparatus 100 (of FIG. 1) which includes a code comparator 110 for comparing source code and bytecode snippets. The computing apparatus 100 may be implemented using various physical resources 1080, such as at least one hardware servers, at least one storage, at least one memory, at least one network interface, and the like. The computing apparatus 100 may also be implemented using infrastructure, as noted above, which may include at least one operating systems 1082 for the physical resources and at least one hypervisor 1084 (which may create and run at least one virtual machine 1086). For example, each multitenant application may be run on a corresponding virtual machine.

Figure 11:
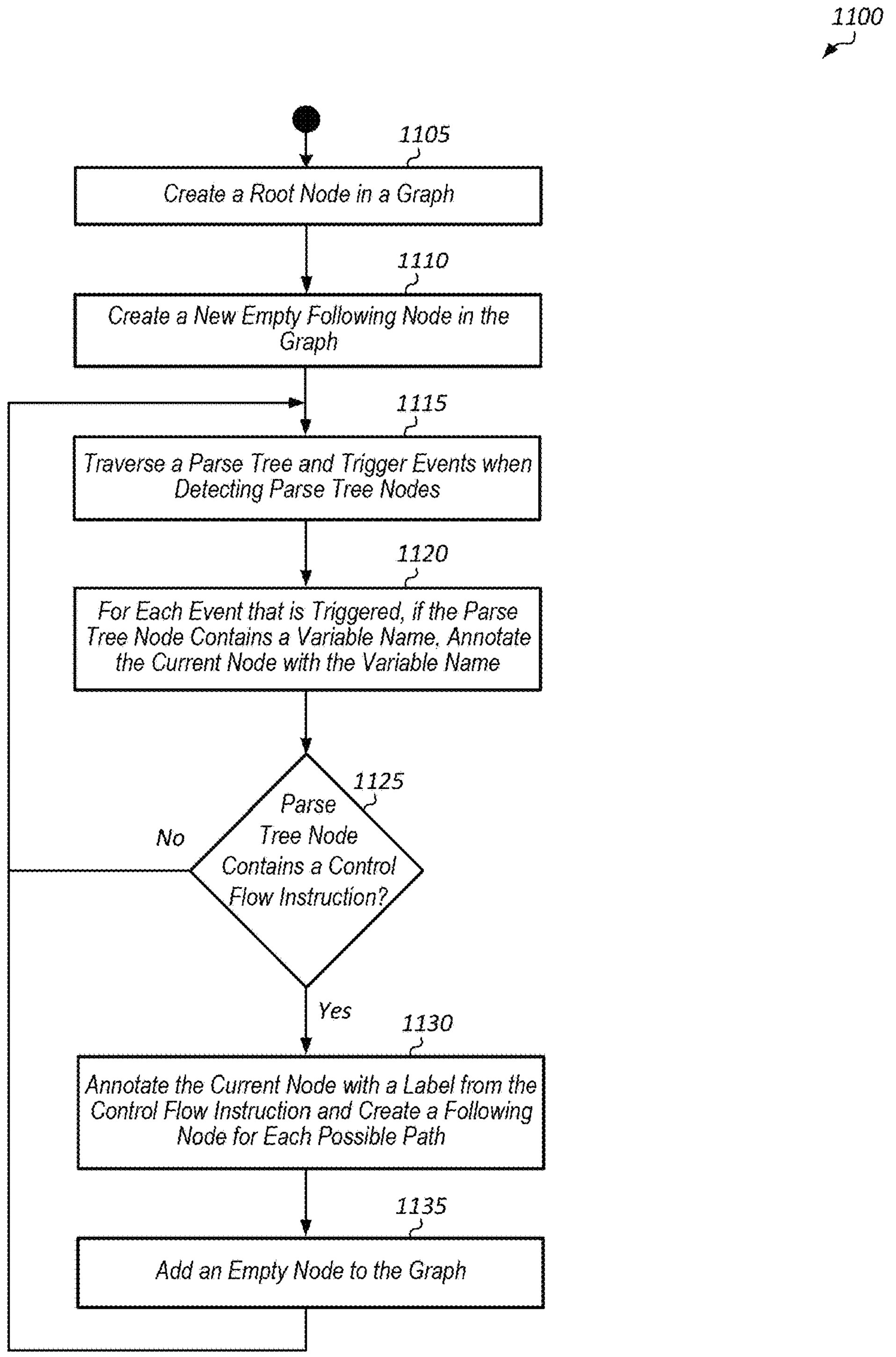
FIG. 11 illustrates an example of a flow diagram of a method for building a graph from a parse tree representative of a source code portion.

Referring now to FIG. 11, a flow diagram illustrating a method 1100 for building a graph from a parse tree representative of a source code portion is shown. At the start of method 1100, a source code analyzer (e.g., source code analyzer 120 of FIG. 1) creates a root node in a graph (block 1105). Next, the source code analyzer creates a new empty following node in the graph (block 1110). Then, the source code analyzer traverses a parse tree and triggers events when detecting parse tree nodes (block 1115). It is noted that the parse tree is created from and/or is representative of a source code portion being analyzed. For each event that is triggered, if a given parse tree node contains a given variable name, then the source code analyzer annotates the current node with the given variable name (block 1120). If the parse tree node contains a control flow instruction (conditional block 1125, "yes" leg), then the source code analyzer annotates the current node with a label (i.e., identifier) from the control flow instruction and creates a following node for each possible path (block 1130). For each following node, the source code analyzer adds an empty node to the graph (block 1135) and then returns to block 1115 to visit the subtree of the following node. Method 1100 may continue until all parse tree nodes have been visited.

Figure 12:
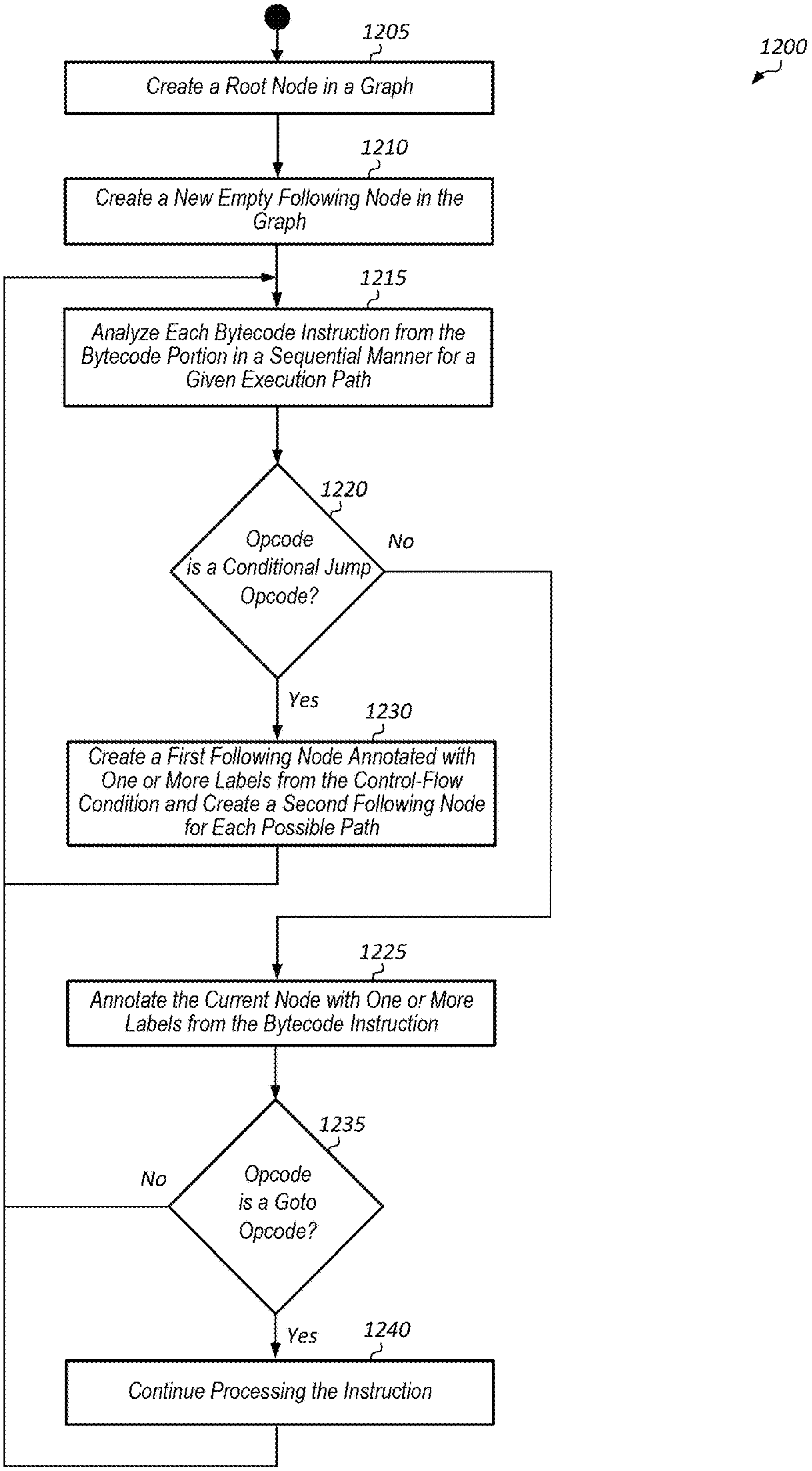
FIG. 12 illustrates an example of a flow diagram of a method for building a graph from a bytecode portion.

Turning now to FIG. 12, a flow diagram illustrating a method 1200 for building a graph from a parse tree representative of a bytecode portion is shown. At the start of method 1200, a bytecode analyzer (e.g., bytecode analyzer 130 of FIG. 1) creates a root node in a graph (block 1205). Next, the bytecode analyzer creates a new empty following node in the graph (block 1210). Then, the bytecode analyzer analyzes each bytecode instruction from the bytecode portion in a sequential manner for a given execution path (block 1215). For each bytecode instruction opcode, if the instruction opcode is not a conditional jump opcode (conditional block 1220, "no" leg), then the bytecode analyzer annotates the current node with one or more labels (e.g., variable name) from the bytecode instruction (block 1225). In an example, the current node may be annotated with one or more labels from the bytecode instruction is the given bytecode opcode is not a conditional jump opcode. If the instruction opcode is a goto opcode (conditional block 1235, "yes" leg), then the bytecode analyzer continues processing the instruction (block 1240).

If the instruction is a conditional jump opcode (conditional block 1220, "yes" leg), then the bytecode analyzer creates a following node annotated with one or more labels from the control-flow condition and creates a following node for each possible path (block 1230). For each following node, the bytecode analyzer returns to block 1215 to analyze each subsequent bytecode instruction. Method 1200 may continue until all instructions from the bytecode portion have been processed.

Figure 13:
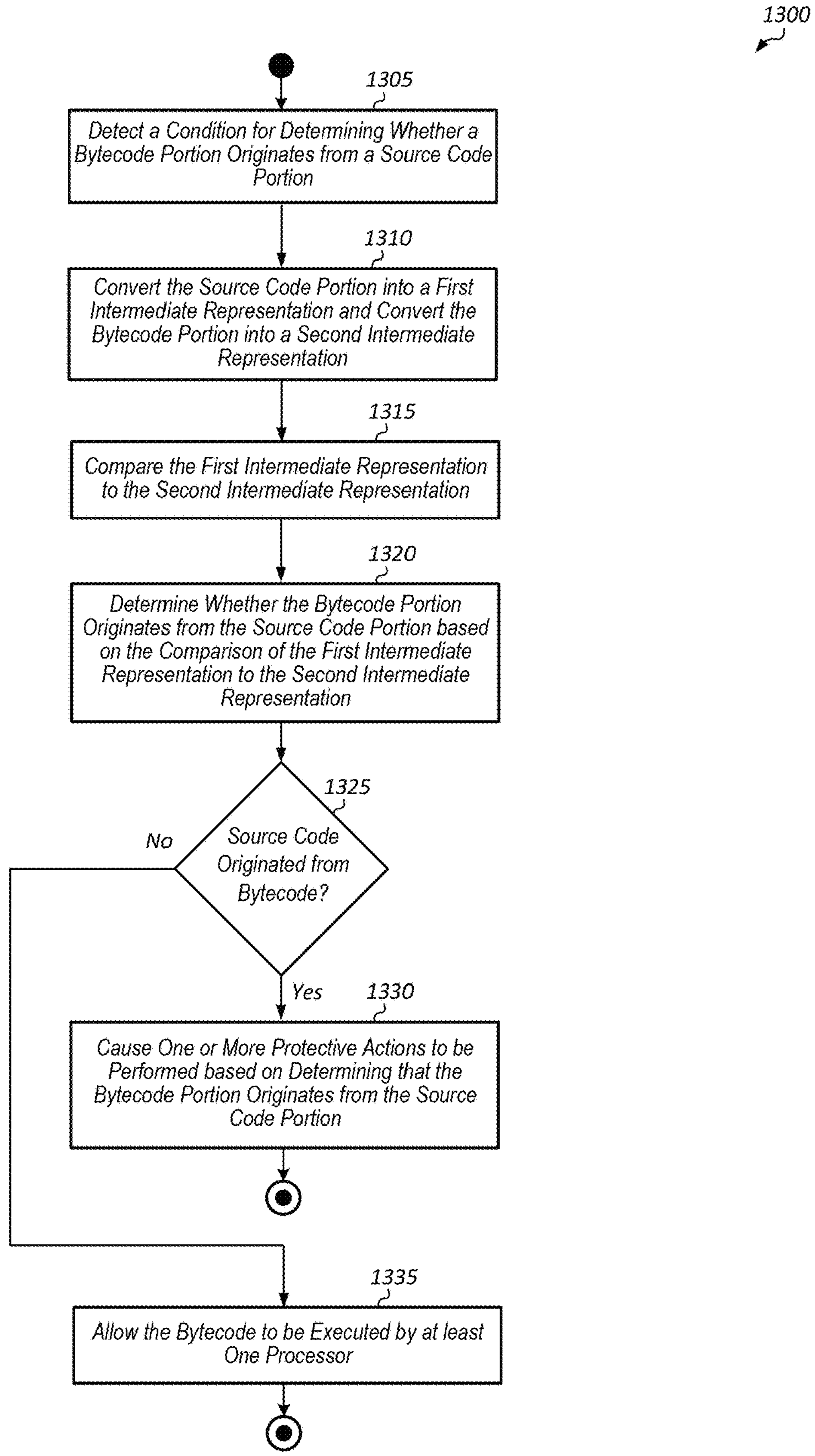
FIG. 13 illustrates an example of a process for determining whether a bytecode portion originates from a source code portion, in accordance with some example implementations of the current subject matter.

Turning now to FIG. 13, a flow diagram illustrating a method 1300 for determining whether a bytecode portion originates from a source code portion is shown. At the start of method 1300, at least one processor of a computing system detects a condition for determining whether a bytecode portion originates from a source code portion (block 1305). In an example, the condition may be detected when the bytecode portion is about to be executed by at least one processor. In an example, the source code portion may correspond to a piece of source code with a known vulnerability, and an organization may wish to determine whether a bytecode portion which is part of some executable program originated from this particular source code portion. In other examples, other conditions may be detected for determining whether the bytecode portion originated from the source code portion.

In response to detecting the condition, the processor converts the source code portion into a first intermediate representation and the processor converts the bytecode portion into a second intermediate representation (block 1310). In various embodiments, the first intermediate representation and the second intermediate representation are graphs. In other embodiments, the first intermediate representation and the second intermediate representation are other types of data structures (e.g., tables, matrices). It is noted that the first intermediate representation and the second intermediate representation may share common characteristics and a common structure allowing them to be compared in order to determine a similarity between the corresponding source code and bytecode portions.

Next, the processor compares the first intermediate representation to the second intermediate representation (block 1315). Then, the processor determines whether the bytecode portion originates from the source code portion based on the comparison of the first intermediate representation to the second intermediate representation (block 1320). If the processor determines that the bytecode portion originates from the source code portion based on the comparison of the first intermediate representation to the second intermediate representation (conditional block 1325, "yes" leg), then the processor causes one or more protective actions to be performed based on determining that the bytecode portion originates from the source code portion (block 1330). After block 1330, method 1300 may end. Depending on the embodiment, the one or more protective actions may include preventing execution of the bytecode portion, generating a notification to a user or administrator, creating and inserting a monitoring instruction prior to the bytecode portion in corresponding executable code, causing a new version of the bytecode portion to be generated from an updated version of the source code portion, and/or other actions.

In an example, the monitoring instruction may be created and inserted into a corresponding executable program immediately prior to the bytecode portion to generate a warning that the bytecode portion is about to be executed. In this example, the monitoring instruction being executed may trigger one or more other actions to be taken. In some cases, a relatively large block of executable code may have many execution paths and it may be difficult for an organization or company to determine whether the vulnerable bytecode portion will ever be reached during execution. In these cases, the monitoring instruction may be created and inserted prior to the vulnerable bytecode portion to serve as an advanced warning mechanism. In another example, the executable code may be placed in a sandbox computing environment where a simulation is run to attempt to reach all executable paths. In this example, if the monitoring instruction is executed in the sandbox computing environment during the simulation, then this indicates that the vulnerable bytecode portion is reachable during execution.

If the processor determines that the bytecode portion does not originate from the source code portion based on the comparison of the first intermediate representation to the second intermediate representation (conditional block 1325, "no" leg), then the processor allows the bytecode portion to be executed by at least one processor (block 1335). It is noted that the at least one processor allowed to execute the bytecode portion in block 1335 may be the same processor which is performing method 1300, or the at least one processor allowed to execute the bytecode portion in block 1335 may be a different processor from the processor performing method 1300. After block 1335, method 1300 may end.

It should be understood that in another embodiment, the "yes" and "no" legs extending out of conditional block 1325 may be reversed. For example, if the source code portion corresponds to an updated version of source code which replaces a previously identified vulnerability, then a match between the bytecode portion and the source code portion indicates that the bytecode portion can be safely executed. In this example, if the bytecode portion does not match the source code portion, then this indicates that the bytecode portion is vulnerable since the bytecode portion likely originates from the earlier version of source code containing the vulnerability. In this example, the "yes" and "no" legs out of conditional block 1325 would be swapped when performing method 1300.

Figure 14:
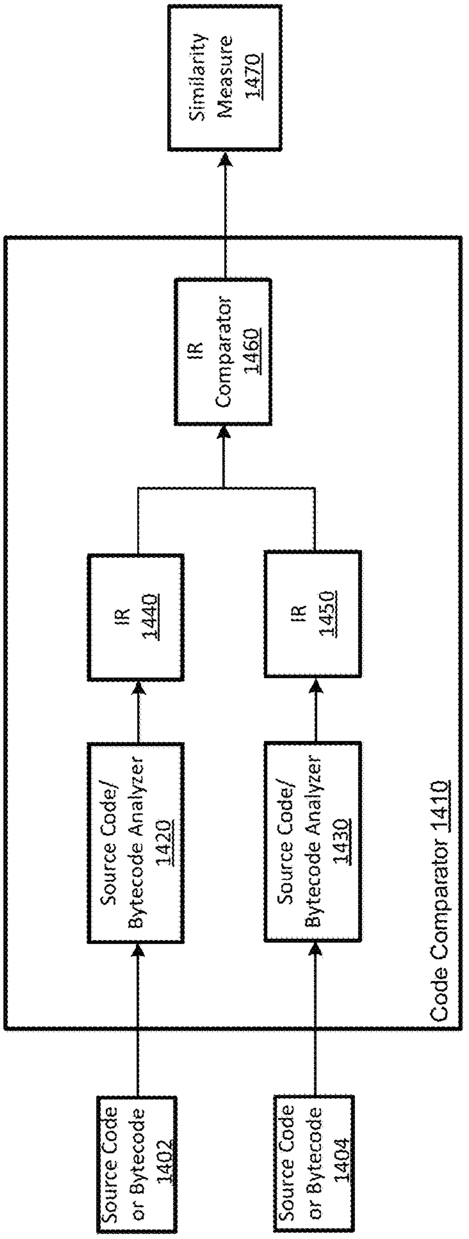
FIG. 14 illustrates a logical diagram of another example of a computing apparatus, in accordance with some example implementations of the current subject matter.

Turning now to FIG. 14, a logical diagram illustrating another example of a computing apparatus 1400 is depicted, in accordance with some example embodiments. In FIG. 14, the computing apparatus 1400 may include a code comparator 1410 which receives source code or bytecode 1402 and source code or bytecode 1404 and compares the two. Depending on the embodiment, code comparator 1410 may compare source code fragment to source code fragment, source code fragment to bytecode fragment, or bytecode fragment to bytecode fragment. Code comparator 1410 may be implemented using any suitable combination of circuitry (e.g., processing unit, programmable logic device, field-programmable gate array (FPGA), application specific integrated circuit (ASIC)), firmware, and/or program instructions.

In an example, code comparator 1410 receives a pair of code fragments which may be source code or bytecode. Source code or bytecode 1402 is processed by source code/bytecode analyzer 1420 in order to perform an analysis of source code or bytecode 1402, and source code or bytecode 1404 is processed by source code/bytecode analyzer 1430 in order to perform an analysis of source code or bytecode 1404. It is noted that source code/bytecode analyzers 1420 and 1430 may also be referred to herein as a code analyzers or analyzers. Analyzer 1420 generates intermediate representation (IR) 1440 of source code or bytecode 1402. Similarly, analyzer 1430 generates IR 1450 of source code or bytecode 1404. IRs 1440 and 1450 are provided as inputs to IR comparator 1460 which returns a similarity measure 1470 based on how similar IR 1440 is to IR 1450. In an example, the similarity measure 1470 may be an estimate of a likelihood that a bytecode portion originated from a source code portion, where the estimate of likelihood is a percentage between 0 and 100. In another example, the similarity measure 1470 may be a metric specifying how similar two code fragments are, with the code fragments being either source code or bytecode.

One or more actions may be taken in response to the similarity measure 1470 that is generated. Alternatively, one or more actions may be taken in response to the comparison performed by IR comparator 1460 meeting one or more conditions. The one or more conditions may vary according to the embodiment. In an example, a first condition may be similarity measure 1470 being greater than a first threshold. In another example, a second condition may be similarity measure 1470 being less than a second threshold.

Depending on the embodiment, the one or more actions taken in response to the similarity measure 1470 that is generated may include preventing execution of one or more of source code or bytecode 1404 and 1406, enabled execution of one or more of source code or bytecode 1404 and 1406, labeling of one or more of source code or bytecode 1404 and 1406 as suspicious or containing a vulnerability, labeling of one or more of source code or bytecode 1404 and 1406 as benign, generating a message, warning, and/or notification, and/or other actions.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method performed by a computing system, comprising: converting a source code portion into a first intermediate representation; converting a bytecode portion into a second intermediate representation; comparing the first intermediate representation to the second intermediate representation; determining whether the bytecode portion originated from the source code portion based on the comparison of the first intermediate representation to the second intermediate representation; and causing one or more protective actions to be performed based on determining that the bytecode portion did not originate from the source code portion.

Example 2: The method of Example 1, wherein the first intermediate representation is a first graph, and wherein the second intermediate representation is a second graph.

Example 3: The method of any of Examples 1-2, wherein the first graph retains one or more representations of control-flow instructions, one or more variable names, and one or more invoked method names from the source code portion.

Example 4: The method of any of Examples 1-3, wherein converting the source code portion into the first graph comprises: creating a root node in the first graph; creating a new empty following node in the first graph; traversing a parse tree and triggering events when detecting parse tree nodes; annotating a current node in the first graph with a given variable name from a given parse tree node if the given parse tree node contains the given variable name; and annotating the current node in the first graph with a label from a control flow instruction and creating, in the first graph, a following node for each possible path if the given parse tree node contains the control flow instruction.

Example 5: The method of any of Examples 1-4, wherein converting the bytecode portion into the second graph comprises: creating a root node in the second graph; creating a new empty following node in the second graph; analyzing each bytecode instruction from the bytecode portion; annotating a current node in the second graph with one or more labels from a bytecode instruction if a given bytecode opcode is not a conditional jump opcode; and creating, in the second graph, a first following node annotated with one or more labels from a control-flow condition and creating, in the second graph, a second following node for each possible path if the given bytecode opcode is a conditional jump opcode.

Example 6: The method of any of Examples 1-5, further comprising generating an estimate of a likelihood that the bytecode portion originated from the source code portion.

Example 7: The method of any of Examples 1-6, wherein the estimate of the likelihood is a percentage between 0 and 100.

Example 8: The method of any of Examples 1-7, further comprising: receiving a request to determine whether the bytecode portion originated from the source code portion; performing the comparison in response to receiving the request; generating an indication that the bytecode portion did originate from the source code portion in response to the comparison meeting one or more conditions; and enabling execution of the bytecode portion in response to determining that the bytecode portion did originate from the source code portion.

Example 9: The method of any of Examples 1-8, wherein the one or more protective actions comprise preventing the bytecode portion from being executed in response to determining that the bytecode portion did not originate from the source code portion.

Example 10: The method of any of Examples 1-9, wherein the first intermediate representation and the second intermediate representation share common characteristics.

Example 11: The method of any of Examples 1-10, wherein the first intermediate representation and the second intermediate representation share a common structure.

Example 12: The method of any of Examples 1-11, further comprising generating a similarity result based on the comparison of the first intermediate representation to the second intermediate representation.

Example 13: A system comprising: at least one processor; and at least one memory including instructions, which when executed by the at least one processor, causes the system to provide operations comprising: converting a source code portion into a first intermediate representation; converting a bytecode portion into a second intermediate representation; comparing the first intermediate representation to the second intermediate representation; determining whether the bytecode portion originated from the source code portion based on the comparison of the first intermediate representation to the second intermediate representation; causing one or more protective actions to be performed based on determining that the bytecode portion did not originate from the source code portion.

Example 14: The system of Example 13, wherein the first intermediate representation is a first graph, and wherein the second intermediate representation is a second graph.

Example 15: The system of any of Examples 13-14, wherein the first graph retains one or more representations of control-flow instructions, one or more variable names, and one or more invoked method names from the source code portion.

Example 16: The system of any of Examples 13-15, wherein converting the source code portion into the first graph comprises: creating a root node in the first graph; creating a new empty following node in the first graph; traversing a parse tree and triggering events when detecting parse tree nodes; annotating a current node in the first graph with a given variable name from a given parse tree node if the given parse tree node contains the given variable name; and annotating the current node in the first graph with a label from a control flow instruction and creating, in the first graph, a following node for each possible path if the given parse tree node contains the control flow instruction.

Example 17: The system of any of Examples 13-16, wherein converting the bytecode portion into the second graph comprises: creating a root node in the second graph; creating a new empty following node in the second graph; analyzing each bytecode instruction from the bytecode portion; annotating a current node in the second graph with one or more labels from a bytecode instruction if a given bytecode opcode is not a conditional jump opcode; and creating, in the second graph, a first following node annotated with one or more labels from a control-flow condition and creating, in the second graph, a second following node for each possible path if the given bytecode opcode is a conditional jump opcode.

Example 18: The system of any of Examples 13-17, further comprising generating an estimate of a likelihood that the bytecode portion originated from the source code portion.

Example 19: The system of any of Examples 13-18, wherein the one or more protective actions comprise preventing the bytecode portion from being executed in response to determining that the bytecode portion did not originate from the source code portion.

Example 20: A non-transitory computer-readable storage medium including instructions, which when executed by at least one processor, causes operations comprising: converting a source code portion into a first intermediate representation; converting a bytecode portion into a second intermediate representation; comparing the first intermediate representation to the second intermediate representation; determining whether the bytecode portion originated from the source code portion based on the comparison of the first intermediate representation to the second intermediate representation; and causing one or more protective actions to be performed based on determining that the bytecode portion did not originate from the source code portion.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method performed by a computing system, comprising:
- converting a source code portion into a first intermediate representation;
- converting a bytecode portion into a second intermediate representation;
- comparing the first intermediate representation to the second intermediate representation;
- determining whether the bytecode portion originated from the source code portion based on the comparison of the first intermediate representation to the second intermediate representation; and
- causing one or more protective actions to be performed based on determining that the bytecode portion did not originate from the source code portion.

2. The method of claim 1, wherein the first intermediate representation is a first graph, and wherein the second intermediate representation is a second graph.

3. The method of claim 2, wherein the first graph retains one or more representations of control-flow instructions, one or more variable names, and one or more invoked method names from the source code portion.

4. The method of claim 2, wherein converting the source code portion into the first graph comprises:
- creating a root node in the first graph;
- creating a new empty following node in the first graph;
- traversing a parse tree and triggering events when detecting parse tree nodes;
- annotating a current node in the first graph with a given variable name from a given parse tree node if the given parse tree node contains the given variable name; and
- annotating the current node in the first graph with a label from a control flow instruction and creating, in the first graph, a following node for each possible path if the given parse tree node contains the control flow instruction.

5. The method of claim 2, wherein converting the bytecode portion into the second graph comprises:
- creating a root node in the second graph;
- creating a new empty following node in the second graph;
- analyzing each bytecode instruction from the bytecode portion;
- annotating a current node in the second graph with one or more labels from a bytecode instruction if a given bytecode opcode is not a conditional jump opcode; and
- creating, in the second graph, a first following node annotated with one or more labels from a control-flow condition and creating, in the second graph, a second following node for each possible path if the given bytecode opcode is a conditional jump opcode.

6. The method of claim 1, further comprising generating an estimate of a likelihood that the bytecode portion originated from the source code portion.

7. The method of claim 6, wherein the estimate of the likelihood is a percentage between 0 and 100.

8. The method of claim 1, further comprising:
- receiving a request to determine whether the bytecode portion originated from the source code portion;
- performing the comparison in response to receiving the request;
- generating an indication that the bytecode portion did originate from the source code portion in response to the comparison meeting one or more conditions; and
- enabling execution of the bytecode portion in response to determining that the bytecode portion did originate from the source code portion.

9. The method of claim 1, wherein the one or more protective actions comprise preventing the bytecode portion from being executed in response to determining that the bytecode portion did not originate from the source code portion.

10. The method of claim 1, wherein the first intermediate representation and the second intermediate representation share common characteristics.

11. The method of claim 1, wherein the first intermediate representation and the second intermediate representation share a common structure.

12. The method of claim 1, further comprising generating a similarity result based on the comparison of the first intermediate representation to the second intermediate representation.

13. A system comprising:

at least one processor; and at least one memory including instructions, which when executed by the at least one processor, causes the system to provide operations comprising:

converting a source code portion into a first intermediate representation;

converting a bytecode portion into a second intermediate representation;

comparing the first intermediate representation to the second intermediate representation;

determining whether the bytecode portion originated from the source code portion based on the comparison of the first intermediate representation to the second intermediate representation;

causing one or more protective actions to be performed based on determining that the bytecode portion did not originate from the source code portion.

14. The system of claim 13, wherein the first intermediate representation is a first graph, and wherein the second intermediate representation is a second graph.

15. The system of claim 14, wherein the first graph retains one or more representations of control-flow instructions, one or more variable names, and one or more invoked method names from the source code portion.

16. The system of claim 14, wherein converting the source code portion into the first graph comprises:

creating a root node in the first graph;

creating a new empty following node in the first graph;

traversing a parse tree and triggering events when detecting parse tree nodes;

annotating a current node in the first graph with a given variable name from a given parse tree node if the given parse tree node contains the given variable name; and annotating the current node in the first graph with a label from a control flow instruction and creating, in the first graph, a following node for each possible path if the given parse tree node contains the control flow instruction.

17. The system of claim 14, wherein converting the bytecode portion into the second graph comprises:

creating a root node in the second graph;

creating a new empty following node in the second graph;

analyzing each bytecode instruction from the bytecode portion;

annotating a current node in the second graph with one or more labels from a bytecode instruction if a given bytecode opcode is not a conditional jump opcode; and creating, in the second graph, a first following node annotated with one or more labels from a control-flow condition and creating, in the second graph, a second following node for each possible path if the given bytecode opcode is a conditional jump opcode.

18. The system of claim 13, further comprising generating an estimate of a likelihood that the bytecode portion originated from the source code portion.

19. The system of claim 13, wherein the one or more protective actions comprise preventing the bytecode portion from being executed in response to determining that the bytecode portion did not originate from the source code portion.

20. A non-transitory computer-readable storage medium including instructions, which when executed by at least one processor, causes operations comprising:

converting a source code portion into a first intermediate representation;

converting a bytecode portion into a second intermediate representation;

comparing the first intermediate representation to the second intermediate representation;

determining whether the bytecode portion originated from the source code portion based on the comparison of the first intermediate representation to the second intermediate representation; and causing one or more protective actions to be performed based on determining that the bytecode portion did not originate from the source code portion.

* * * * *